United States Patent [19]

McBrayer

[11] 4,220,732
[45] Sep. 2, 1980

[54] MICROCELLULAR POLYURETHANE FOAMS

[75] Inventor: Robert L. McBrayer, Lincoln Park, Mich.

[73] Assignee: BASF Wyandotte Corporation, Wyandotte, Mich.

[21] Appl. No.: 972,641

[22] Filed: Dec. 22, 1978

[51] Int. Cl.² ............................................. C08G 18/14
[52] U.S. Cl. ................................................... 521/167
[58] Field of Search ........................................ 521/167

[56] References Cited

U.S. PATENT DOCUMENTS

| | | | |
|---|---|---|---|
| 3,580,869 | 5/1971 | Rhodes et al. | 521/167 |
| 3,929,730 | 12/1975 | Graefe et al. | 521/159 |
| 3,993,576 | 11/1976 | Barron | 521/176 |

*Primary Examiner*—Maurice J. Welsh
*Attorney, Agent, or Firm*—Norbert M. Lisicki; Joseph D. Michaels

[57] ABSTRACT

A method of improving the load-bearing properties of microcellular flexible, urethane foams wherein the processing characteristics for the production thereof are also improved, which comprises utilizing a combination of 1,4-butanediol and phenyldiethanolamine as a chain extender.

4 Claims, No Drawings

MICROCELLULAR POLYURETHANE FOAMS

BACKGROUND OF THE INVENTION

1. Field of the Invention

This invention relates to improved microcellular polyurethane foams, and more particularly to such foams having improved load-bearing properties together with improved processing characteristics.

2. Prior Art

Flexible polyurethane foams are well known, and it is also well known to utilize a chain extender therein. One of the chain extenders now in popular use is 1,4 butane diol. The flexible polyurethane foams may be prepared by a number of methods. However, by far the most popular and most economical is the "one shot" method. In this method the foam is prepared by mixing the reactants together simultaneously through the use of a multiple mixing head on the foam machine. The essential ingredients are polyol, polyisocyanate, surfactant, blowing agent and a catalyst. When butane diol is utilized as the chain extending agent, it is considered, in general, as part of the polyol mixture utilized.

Usually the polyol mixture is prepared and added as a unit. However, the use of 1,4 butane diol has certain disadvantages. One of these is the tendency to separate from the other polyols prior to use. One of the ways of overcoming this disadvantage is to thoroughly mix the polyol just prior to the use thereof. Other solutions to this problem have been suggested by the prior art. For example, U.S. Pat. No. 3,993,576 discloses the use of additional polyols as solubilizers. U.S. Pat. No. 3,929,730 shows a combination of butane diol and phenylenediethanolamine as a chain extender, and the patentee claims an advantage is better solubility of the polyol. Although this patent is directed primarily to cast urethanes, it does mention that the compositions may be utilized for making foams. While these patents disclose a method for overcoming the separation problem, it is noteworthy that none of them suggests any enhanced physical properties in polyurethane foams made from these compositions.

The prior art also includes some technical data on phenyldiethanolamine, specifically publication No. D-131 of Eastman Kodak Company. This publication cites phenyldiethanolamine as being an excellent cure promoter for water extended polyester resin. The publication also describes the use of phenyldiethanolamine as a chain extender for polyurethane elastomers. However, the data indicates that the phenyldiethanolamine is an inferior chain extender as compared to 1,4 butane diol. Accordingly, although there would be some cost advantage in utilizing phenyldiethanolamine as a chain extender, the physical properties shown in the technical bulletin suggest that such use in deleterious to the desired properties of the finished foam product.

SUMMARY OF THE INVENTION

The present invention is based on the discovery that improved microcellular polyurethane foams may be made utilizing 1,4 butane diol as a chain extender when from about one percent to 80 percent by weight of the 1,4-butane diol is substituted with phenyldiethanolamine with the total amount of chain extender being equivalent to an amount of 100 percent 1,4-butane diol heretofore used. Use of say about 10 percent phenyldiethanolamine with about 90 percent 1,4-butane diol (by weight) completely solves the separation problem mentioned above, and uses of from 1 to 10 percent (by weight) tends to alleviate the problem in an amount depending upon the amount of substitution. In addition, it has been found, quite unexpectedly, that the use of phenyldiethanolamine along with 1,4-butane diol increases certain of the physical properties, and this advantage occurs over the range of about 1 percent to about 80 percent by weight phenylenediethanolamine. The preferred areas of substitution are say 10 percent to 65 percent by weight and the actual amount chosen will depend on the physical properties desired, and the cost saving achieved by substituting a more inexpensive ingredient for a more expensive ingredient.

These and other objectives and advantages of the invention will become more fully apparent in the more detailed and comprehensive discussion of the present invention, which is found in the following description and examples thereof.

DESCRIPTION OF THE PREFERRED EMBODIMENT

The organic polyiscocyanate used in the preparation of the foams in the process of the subject invention corresponds to the formula:

wherein R" is a polyvalent organic radical which is either aliphatic, aralkyl, alkaryl, aromatic or mixtures thereof, and z is an integer which corresponds to the valence of R" and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'-5,5-tetraisocyanate, and the like; arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated for use herein are the so-called "quasiprepolymers". These quasi-prepolymers are prepared by reacting an excess of organic polyisocyanate or mixtures thereof with a minor amount of an active hydrogen-containing compound as determined by the well-known Zerewitinoff test, as described by Kohler in *Journal Of The American Chemical Society*, 49, 3181 (1927). These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group and hydroxyl-terminated polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinc acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, 1,3-propylene glycol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxide having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including atomatic polyamines such as methylene dianiline, polyarylpolyalkylene polyamine (crude methylene dianiline), p-aminoaniline, 1,5-diaminonaphthalene, and 2,4-diaminotoluene; aliphatic polyamines such as ethylenediamine, 1,3-butylenediamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639, and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542. As is clear from the above, the particular polyol ingredient employed in the preparation of the quasi-prepolymer is not a critical aspect of the present invention. Any compound containing at least two reactive hydrogen atoms may be so used.

Particularly preferred compounds are those having an equivalent weight between 100 and 1500.

The chain extender utilized in accordance with the invention is present in about 0.2 to about 40 percent by weight based on weight of the polyol. This chain extender consists essentially of from about one percent to about 80 percent by weight of phenyldiethanolamine and from about 20 to about 99 percent by weight of 1,4 butane diol. It has been found that the tangental modulus of foams produced according to the invention (i.e. those incorporating the chain extender combination defined herein) is greater than either the use of 100 percent 1,4-butane diol or 100 percent phenyldiethanolamine. Thus, the use of chain extenders in accordance with the invention produce improved physical properties in the resulting polyurethane foams.

Preferably, the chain extender consists essentially of from about 10 percent to about 65 percent by weight of phenyldiethanolamine and from about 35 percent to about 90 percent by weight of 1,4-butane diol. It has been found that when amounts of about 10 percent of phenyldiethanolamine are combined with the 1,4-butane diol that the separation heretofor encountered in the polyol mixtures is no longer likely to occur during processing. In prior processes, the incompatability of the 1,4-butane diol with the usual polyols utilized to make foam required constant recirculation or agitation to achieve proper results. In other words, any dead spots in feeder recirculation lines were prone to separation and subsequent defects in finished foam parts. With about 10 percent or more of the chain extenders containing phenyldiethanolamine, phase separation is delayed significantly. When the phenyldiethanolamine portions reach approximately 50 percent, the solution becomes stable for a week or more. Thus, increasing the amount of phenyldiethanolamine reduces the phase separation problems heretofore encountered.

On the other hand, use of excessive amounts of phenyldiethanolamine no longer results in the desired improved physical properties, and, instead, after a point it causes inferior physical properties as compared to 1,4-butane diol alone. It will, of course, be appreciated that the actual physical properties will vary depending upon the specific recipies utilized, and therefore, optimum amounts will vary. In addition, there may be changes in the specifications desired for the physical properties of the foamed product. Once again, variations in physical properties are obtainable by utilizing different proportions of the two ingredients in the chain extender system, and this flexibility is also advantageous.

Catalysts that are useful in producing resilient polyurethane foams in accordance with this invention include:

a. tertiary amines such as triethylenediamine, bis(-dimethylamino ethyl)ether, triethylamine, triethylamine, N-methylmorpholine, N-ethylmorpholine, N,N-dimethylbenzylamine, N,N-dimethyl ethanolamine, and the like;

b. tertiary phosphines, such as, trialkyl phosphines, dialkyl benzyl phosphines, and the like;

c. strong bases such as alkaline and alkali earth metal hydroxides, and phenoxides;

d. acidic metal salts of strong acids such as ferric chloride, stannic chloride, stannous chloride, antimony trichloride, bismuth nitrate and chloride and the like;

e. chelates of various metals such as those obtained from acetylacetone, benzoyl acetone, ethyl acetoacetate and the like;

f. alcoholates and phenolates of various metals such as $Ti(OR)_4$, $Sn(OR)_2(Al(OR)_3$, and the like wherein R is alkyl or aryl and the like;

g. salts of organic acids with a variety of metals such as alkali metals, alkaline earth metals, Al, Sn, Mn, Pb, Co, Ni, and Cu, including, for example, sodium acetate, potassium laurate, calcium hexanoate, stannous acetate, stannous octoate, stannous oleate, lead octoate, metallic dryers such as manganese and cobalt naphthenates, and the like;

h. organic metallic derivatives of tetravalent tin trivalent and pentavalent arsenic, antimony and bismuth, and metal carbonyls of iron, cobalt and nickel.

The resilient polyurethane foams of this invention are preferably prepared by a so-called "one-step" method which involves reacting a polyhydroxy compound with at least one polyisocyanate in the presence of a blowing agent, such as, water, a liquefied gas or the like. It is also desirable to conduct the reaction in the presence of a catalyst and surfactants. In general, it is desirable to employ at least one—NCO equivalent (group) per hydroxyl equivalent (group) in the preparation of urethane foamed products.

As indicated previously, various blowing agents such as water and halogenated hydrocarbons can be employed in the preparation of the foam of this invention. The preferred blowing agents are water and certain halogen-substituted aliphatic hydrocarbons which have boiling points between about −40° C. and 70° C. and which vaporize at or below the temperature of the foaming mass. Illustrative, are for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-1-fluoromethane, 1,1-difluoro-1,2,2-trichloroethane, chloropentafluoroethane, 1-chloro-1-fluoroethane, 1-chloro-2-fluoroethane, 1,1,2-trifluoroethane, 2-chloro-1,1,1,2,3,3,4,4,4-nonafluorobutane, hexafluorocyclobutane and octafluorobutane. Other useful blowing agents include low boiling hydrocarbons such as butane, pentane, hexane, cyclohexane and the like. Many other compounds easily volatilized by the exotherm of the isocyanato-hydroxy reaction can also be employed.

The amount of blowing agent used will vary with the density desired in the foamed product. When water is employed as a blowing agent, it is preferred to use about 0.1 to about 5 percent water based upon the total weight of the urethane foaming composition.

In addition to the previously defined ingredients useful in the preparation of the foam, other ingredients, such as surfactants, fillers, pigments and the like can also be included. Surfactants which can be used are conventional surfactants used in urethane preparation such as the polysiloxanes, oxyalkylated polysiloxanes or the alkylene oxide adducts of organic compounds containing reactive hydrogen atoms.

Generally, the surfactant is employed in an amount ranging from about 0.01 part to 5 parts by weight thereof per hundred parts of polyol. Conventional fillers for use herein include, for example, aluminum silicate, calcium silicate, magnesium silicate, calcium carbonate, barium sulfate, calcium sulfate, carbon black and silica. The filler is nominally present in an amount ranging from about 5 parts to 50 parts by weight thereof per hundred parts by weight of polyol and, preferably, from about 15 parts to 45 parts by weight thereof per one hundred parts by weight of polyol.

The pigment which can be used herein can be selected from any conventional pigment heretofore disclosed in the art, such as, titanium dioxide, zinc oxide, iron oxides, antimony oxide, chrome green, chrome yellow, iron blue siennas, molybdate oranges, organic pigments such as para reds, benzidine yellow, toluidine red, toners, and phthalocyanines.

Foam Preparation

The phenyldiethanolamine was added slowly to the polyol, heated to 120°-125° F. in order to melt the solid. A continuous nitrogen sweep was used to prevent oxidation. After the solid was melted, the blend was cooled to room temperature before addition of the 1,4-butanediol. In Examples I and III below, a control formulation was provided in which only 1,4-butanediol was used as the chain extender.

The hand-mixed foams were prepared by weighing the polyol, chain extender, amine catalyst and tin catalyst to a one-quart capacity cylindrical container. The mixture was stirred with a light duty bench top drill press equipped with a 1¼ inch diameter shrouded mixing blade. The stirring was timed by a stop watch. Mixer speed was 3400 rpm.

The stop watch and the mixer were started simultaneously and the mixture was initially stirred for 30 seconds. The isocyanate was then added quickly with the mixing continuing. After all the isocyanate was all added, stirring continued from 5 to 10 seconds depending on the system reactivity. The mixer was stopped and the mixture was poured immediately into the mold. The mold was constructed from aluminum plate and had a 12×12×⅛ inch cavity. The mold was pretreated with Park Chemical PRC 765 mold release and the temperature at the time of pour was 125°±5° F. Four to pull time was four minutes. No post cure was necessary.

The following examples are provided to further illustrate the invention, and all concentrations in the following examples are parts by weight unless otherless specified. In these examples, the polyols and polyisocyanates employed have the following compositions:

Polyol A—a polyol prepared by the reaction of ethylene oxide with the propylene oxide adduct of trimethylpropane, said polyol having an average molecular weight of 6500, and an ethylene oxide content of 15 percent by weight.

Polyol B—a polyol prepared by the reaction of ethylene oxide with the propylene oxide adduct of propylene glycol, said polyol having an average molecular weight of 3650 and an ethylene oxide content of 18 percent by weight.

Polyol C—a polyol prepared by the reaction of ethylene oxide with the propylene oxide adduct of propylene glycol, said polyol having an average hydroxyl number of 26.5 and an ethylene oxide content of 20 percent by weight.

Polyol D—a graft polyol having a hydroxyl number of 26 prepared by the in situ polymerization of 12 weight percent styrene, 8 weight percent acrylonitrile, and 80 weight percent of a polyol containing unsaturation, said polyol having a hydroxyl number of 33 and prepared by capping with ethylene oxide a heteric adduct of a mixture of propylene oxide and allylglycidylether with glycerine and propylene glycol.

MDI A—diphenylmethane diisocyanate heat modified to form carbodiimide groups and having an isocyanate content of 23 percent by weight.

MDI B—diphenylmethane diisocyanate heat modified to form carboiimide groups and having an isocyanate content of 26 percent by weight.

EXAMPLES 1 AND 2

Foams were prepared utilizing 1,4-butane diol (Example 1) for the sake of comparison, and both 1,4-butane diol and phenyldiethanolamine combined (Example 2) as a chain extender utilizing the procedure given above. Four runs of each were made and tested for physical properties. The formulation and average physical property data are given in Table I below.

Table I

| | Example 1 | Example 2 |
|---|---|---|
| Formulation (parts by weight) | | |
| Polyol A | 23 | 23 |
| Polyol B | 77 | 77 |
| 1,4-butanediol | 28.5 | 16.5 |
| Phenyldiethanolamine | 0 | 24 |
| Dibutyl tin dilaurate (Thermolite 12) | 0.02 | 0.02 |
| triethylenediamine | 0.5 | 0.5 |
| Trichlorofluoromethane | 2 | 2 |
| Water | 0.194 | 0.15 |
| MDI A | 135.6 | 134.4 |
| Physical properties | | |
| Density, pcf. | 65.90 | 65.04 |
| Tensile, psi. | 3103 | 2815 |
| 200% Modulus, psi | 2873 | 2463 |
| 100% Modulus, psi | 2590 | 2393 |
| Elongation, % | 253 | 293 |
| Graves Tear, pi. | 631 | 768 |
| Shore "D" Hardness | | |
| Instantaneous | 65 | 69 |
| 5 Second | 60 | 64 |
| Flex Modulus, D747, psi | | |
| 75° F. | 53,739 | 66,166[a] |

[a]Estimated values, capacity of testing machine exceeded.

The formulation of Example 2 unexpectedly gave improved elongation, Graves tear, Shore "D" hardness and flexural modulus properties compared to the control formulation of Example 1. The only property poorer than the control was tensile strength which had approximately a 9 percent loss.

The unexpected results of this invention lead to preparation of improved high modulus microcellular foams. A 23 percent increase in modulus was achieved with a gain in elongation and tear strength, and only a minor loss in tensile strength.

EXAMPLES 3-8

Foams were prepared utilizing 1,4-butane diol along (Example 3) and various proportions of 1,4-butane diol and phenyldiethanolamine combined (Examples 4-8) as a chain extender utilizing the procedure given above. Three runs of each were made and tested for physical properties. The formulations and average physical properties are given in Table II below.

Table II

| | Example 3 | Example 4 | Example 5 | Example 6 | Example 7 | Example 8 |
|---|---|---|---|---|---|---|
| Formulation (pts. by wt.) | | | | | | |
| Polyol A | 65 | 65 | 65 | 65 | 65 | 65 |
| Polyol C | 30 | 30 | 30 | 30 | 30 | 30 |
| Polyol D | 5 | 5 | 5 | 5 | 5 | 5 |
| 1,4-Butanediol | 24.5 | 24 | 23.5 | 21.5 | 17.5 | 17.5 |
| Phenyldiethanolamine | — | 1.01 | 2.01 | 6.04 | 14.1 | 14.1 |
| Dibutyl tin diluarate | 0.03 | 0.03 | 0.03 | 0.03 | 0.03 | 0.015 |
| Triethylene diamine | 0.5 | 0.5 | 0.5 | 0.5 | 0.5 | 0.5 |
| MDI B | 99.3 | 99.3 | 99.3 | 99.3 | 99.3 | 99.3 |
| Reaction Characteristics | | | | | | |
| Mix, sec. | 10 | 10 | 10 | 10 | 10 | 10 |
| Cream, sec. | 19 | 19 | 18 | 17 | 16 | 20 |
| Rise, sec. | 28 | 26 | 25 | 24 | 22 | 28 |
| Tack-free, sec. | 28 | 26 | 25 | 24 | 22 | 28 |
| Physical Properties | | | | | | |
| Section density, pcf. | 64.31 | 63.04 | 63.59 | 61.72 | 55.53 | 53.43 |
| Tensile, psi. | 1983 | 1950 | 1963 | 1883 | 1670 | 1377 |
| Modulus, psi. | | | | | | |
| 100% | 1703 | 1650 | 1657 | 1587 | 1480 | 1405 |
| 200% | — | — | 2150 | — | — | — |
| Elongation, % | 157 | 163 | 163 | 153 | 133 | 83 |
| Graves tear, pi. | 333 | 362 | 366 | 358 | 277 | 247 |
| Shore "D", | | | | | | |
| inst. | 47 | 46 | 45 | 47 | 45 | 45 |
| 5 sec. | 43 | 41 | 41 | 42 | 42 | |
| Heat sag | 0.27 | 0.33 | 0.34 | 0.53 | 1.57 | 1.81 |
| Tangential modulus psi. | | | | | | |
| at R.T. | 16,551 | 16,586 | 17,983 | 15,369 | 16,786 | 15,369 |
| Days to separate | <1 | <1 | 2 | 3 | 7 | — |

At the high level of phenyldiethanolamine, the reported increase in modulus does not at first appear to have occurred. If, however, density is considered, the modulus is maintained while density decreases. A loss in modulus would be expected with reduced density.

The Examples in Table II also show an additional benefit for use of phenyldiethanolamine, namely, improved compatability, while maintaining the improved modulus properties.

The embodiments of the invention in which an exclusive property or privilege is claimed are defined as follows:

1. Polyurethane foam made from the reaction products of at least one polyoxyalkylene ether polyol having a hydroxyl functionality of at least two with at least one organic polyisocyanate in the presence of a blowing agent with about 0.2 to about 40 percent by weight based on the polyol of a chain extender comprising from about 1 percent to about 80 percent by weight of phenyldiethanolamine and from about 20 percent to about 99 percent by weight of 1,4-butane diol.

2. A polyurethane foam as defined in claim 1, wherein the chain extender comprises from about 10 percent to about 65 percent by weight of phenyldiethanolamine and from about 35 percent to about 90 percent by weight of 1,4-butane diol.

3. A polyurethane foam as defined in claim 1, wherein the blowing agent is water.

4. A polyurethane foam as defined in claim 1, wherein a major portion of the polyisocyanate is diphenylmethane diisocyanate.

* * * * *